US011265416B2

(12) United States Patent
Vaughn et al.

(10) Patent No.: US 11,265,416 B2
(45) Date of Patent: Mar. 1, 2022

(54) MANAGEMENT OF COMMUNICATION NOTIFICATIONS BASED UPON GEOGRAPHIC LOCATION

(71) Applicant: KYNDRYL, INC., New York, NY (US)

(72) Inventors: Garfield W. Vaughn, South Windsor, CT (US); Moncef Benboubakeur, Brno (CZ); Julija Narodicka, Brno (CZ); Anuradha Bhamidipaty, Yorktown Heights, NY (US)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 16/432,258

(22) Filed: Jun. 5, 2019

(65) Prior Publication Data

US 2020/0389551 A1 Dec. 10, 2020

(51) Int. Cl.
*H04M 1/72457* (2021.01)
*H04M 3/42* (2006.01)
(Continued)

(52) U.S. Cl.
CPC ... *H04M 1/72457* (2021.01); *H04M 1/72454* (2021.01); *H04M 1/72484* (2021.01);
(Continued)

(58) Field of Classification Search
CPC ......... H04M 1/72572; H04M 1/72569; H04M 1/72597; H04M 3/42059; H04M 2242/14; H04M 2242/28; H04W 4/20
See application file for complete search history.

(56) References Cited

U.S. PATENT DOCUMENTS

| 7,027,463 B2 | 4/2006 | Mathew |
| 7,260,403 B1 * | 8/2007 | Zhang ..................... H04L 45/00 455/433 |

(Continued)

FOREIGN PATENT DOCUMENTS

| AU | 2015348046 A1 * | 7/2017 | .......... H04M 3/4878 |
| EP | 2463839 A1 * | 6/2012 | ......... G08B 21/0286 |
| JP | 2009110447 A * | 5/2009 | |

OTHER PUBLICATIONS

"Method and System for Delivering Voice/Text Messages Based on Location of Users", An IP.com Prior Art Database Technical Disclosure, IP.com No. IPCOM000198957D IP.com Electronic Publication Date: Aug. 18, 2010, 4 Pages.
(Continued)

*Primary Examiner* — Charles T Shedrick
(74) *Attorney, Agent, or Firm* — Erik Swanson; Andrew M. Calderon; Roberts Calderon Safran & Cole, P.C.

(57) ABSTRACT

Embodiments of the present invention provide notification management across a plurality of electronic communication devices based on the present situational context of the intended communication recipient. Some types of relevant situational context information include the geographic location of the intended recipient, what electronic communication devices they may have in their possession, calendar or schedule information, the presence of other people, the identity of other people present in their vicinity, their relationship to the communication sender, and context information concerning the sender, such as how frequently the sender has attempted to communicate with the intended recipient and news information relevant to the known or assumed location of the sender. Notifications are managed by adjusting which electronic communication devices emit notifications and what type of notifications are emitted.

12 Claims, 4 Drawing Sheets

(51) Int. Cl.
*H04W 4/20* (2018.01)
*H04M 1/72454* (2021.01)
*H04M 1/72484* (2021.01)

(52) U.S. Cl.
CPC ......... *H04M 3/42059* (2013.01); *H04W 4/20* (2013.01); *H04M 2242/14* (2013.01); *H04M 2242/28* (2013.01)

(56) References Cited

U.S. PATENT DOCUMENTS

| | | | |
|---|---|---|---|
| 7,272,407 B2* | 9/2007 | Strittmatter | H04L 12/2809 455/500 |
| 7,516,219 B2 | 4/2009 | Moghaddam | |
| 9,769,106 B2 | 9/2017 | Benchenaa | |
| 10,212,268 B1* | 2/2019 | Greenfield | H04M 1/72457 |
| 2002/0168987 A1 | 11/2002 | Wang | |
| 2005/0163104 A1* | 7/2005 | Christensen | H04L 65/1069 370/352 |
| 2007/0217437 A1* | 9/2007 | Forte | H04M 3/42314 370/401 |
| 2008/0153474 A1* | 6/2008 | Scott | H04M 1/2745 455/418 |
| 2008/0299954 A1* | 12/2008 | Wright | H04L 67/303 455/414.1 |
| 2008/0305780 A1* | 12/2008 | Williams | H04W 4/027 455/414.1 |
| 2010/0004005 A1 | 1/2010 | Pereira | |
| 2010/0040215 A1* | 2/2010 | Gupta | H04M 3/42238 379/142.07 |
| 2010/0289867 A1* | 11/2010 | Nimri | H04N 7/152 348/14.08 |
| 2011/0194680 A1* | 8/2011 | Mourya | H04M 3/42042 379/142.04 |
| 2011/0317684 A1* | 12/2011 | Lazzaro | H04L 61/2069 370/352 |
| 2012/0105203 A1 | 5/2012 | Elliot | |
| 2014/0359647 A1* | 12/2014 | Shoemake | H04N 21/44218 725/10 |
| 2015/0054910 A1 | 2/2015 | Offen | |
| 2015/0172462 A1* | 6/2015 | Cudak | H04W 4/16 455/413 |
| 2016/0094437 A1* | 3/2016 | On | H04L 65/1069 370/352 |
| 2016/0191636 A1* | 6/2016 | Healey | H04W 4/21 709/205 |
| 2016/0219421 A1* | 7/2016 | Shi | H04W 76/15 |
| 2016/0330319 A1* | 11/2016 | Farrand | H04M 1/663 |
| 2017/0094455 A1* | 3/2017 | Beaurepaire | H04W 4/02 |
| 2018/0032529 A1 | 2/2018 | Aradhye | |
| 2019/0356176 A1* | 11/2019 | Lee | H04M 1/02 |

OTHER PUBLICATIONS

Lyden, Sean, "6 Mobile Applications to Prevent Distracted Driving Accidents" Aug. 1, 2011, automotive FLEET, <https://www.automotive-fleet.com/147634/6-mobile-applications-to-prevent-distracted-driving-accidents>, 13 pages.

Nield, David, "How To Stop Your Dang Phone From Ringing in Places It Shouldn't", Gizmodo, Jul. 11, 2016, 5 pages, <https://gizmodo.com/how-to-stop-your-dang-phone-from-ringing-in-places-it-s-1783293783>.

Volpe, Joseph, "Google patents location-based mobile alerts that know where you're going to", Jun. 6, 2012, 10 pages, <https://www.engadget.com/2012/06/06/google-patents-location-based-mobile-alerts-that-know-where-you/>.

\* cited by examiner

MANAGEMENT OF COMMUNICATION NOTIFICATIONS BASED UPON GEOGRAPHIC LOCATION

BACKGROUND

The present invention relates generally to notifications of incoming electronic communications directed to a user, and more particularly to machine logic for managing how notifications of electronic communications are directed to a user's communication device(s).

Various types of "incoming communication notifications" for example, a telephone (or a smart phone being used as a telephone) may ring, vibrate and/or display a visual display indicating an incoming communication is being received. With incoming instant messaging chat communications, or incoming emails, a user's laptop may make a predetermined notification sound and/or display a pop-up window to notify about the communication.

In conventional technologies, users can control their communication devices so that there is some degree of selectivity in which communications come through and which do not. For example, many traditional landline telephones can have their ringers muted, so that there will be no incoming communication notifications for any calls received during periods of time when the muting of the ring function is activated. More recently, there is technology for selectively handling incoming communication notifications based upon the identity of the sender of the attempted communication (for example, the identity of a caller calling a user's smart phone). As a further example of selectivity in transmitting incoming communication notifications, the decision to present an incoming communication notification may be based upon both the identity of the sender and the time of day (for example, during nighttime hours chat messages from family, but not friends, might cause a user's smart phone to beep).

SUMMARY

According to an aspect of the present invention, there is a method, computer program product and/or system that performs the following operations (not necessarily in the following order): (i) receiving a receiver-user device data set indicative of an identity of a plurality of electronic communication device(s) (ECD) belonging to the receiver-user; (ii) receiving a receiver-user contacts data set including information indicative of an identity of a plurality of contact(s); (iii) receiving a receiver-user profile data set including a plurality context-contact management rule(s), where each rule includes information indicative of how incoming electronic communications directed to the receiver-user from one or more contact(s) should be managed on the plurality of ECD responsive to one or more conditions present in a situation context of the receiver-user; (iv) receiving a receiver-user context data set including information indicative of a present situation context of the receiver-user; (v) selecting, by machine logic, at least one context-contact management rule from the receiver-user profile data set for present incoming electronic communication management operations based, at least in part, on the receiver-user context data set; (vi) receiving an incoming electronic communication (IEC) directed to the receiver-user from a contact identified in the receiver-user contacts data set; and (vii) managing, by machine logic, the IEC based, at least in part, on the selected context-contact management rule. Wherein the information indicative of a present situation context of the receiver-user includes information indicative of a present geographic location of the receiver-user.

DETAILED DESCRIPTION

Figure 1:
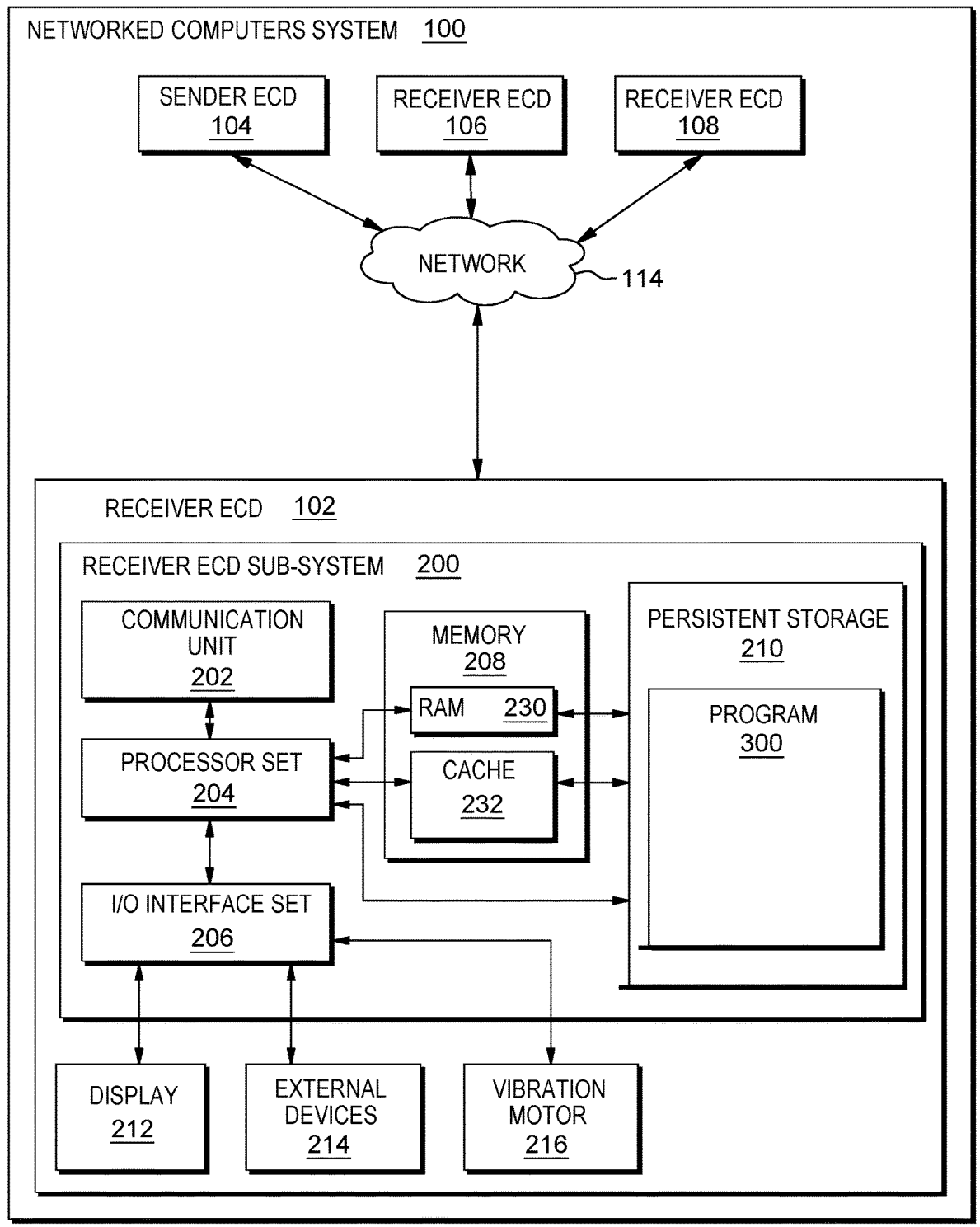
FIG. 1 is a block diagram view of a first embodiment of a system according to the present invention.

Some embodiments of the present invention include technology for managing communication notifications across a plurality of devices based on the context of the receiver, including the receiver's present geographic location. Several communication devices implement software to manage which device in the possession of a receiver outputs a notification and what type of notification is outputted. Embodiments of the present invention represent technological improvements upon technological problems, as it becomes more common for individuals to own multiple communication devices that they carry on their person, where a given context of an individual might influence how discreet an individual desires their notifications to be, and each communication device may be more suitable than others to the desired discretion. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: receiver ECD 102; sender ECD 104; receiver ECD 106, 108; communication network 114; receiver ECD sub-system 200; communication unit 202; processor set 204; input/output (I/O) interface set 206; memory device 208; persistent storage device 210; display device 212; external device set 214; vibration motor 216; random access memory (RAM) devices 230; cache memory device 232; and program 300.

Receiver ECD 102 is, in many respects, representative of the various computer sub-system(s) in the present invention. Accordingly, several portions of receiver ECD 102 will now be discussed in the following paragraphs.

Receiver ECD 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Receiver ECD 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Receiver ECD 102 is shown as a block diagram with many double arrows. These double arrows (no separate reference numerals) represent a communications fabric, which provides communications between various components of receiver ECD 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for receiver ECD 102; and/or (ii) devices external to receiver ECD 102 may be able to provide memory for receiver ECD 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to receiver ECD 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with receiver ECD sub-system 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
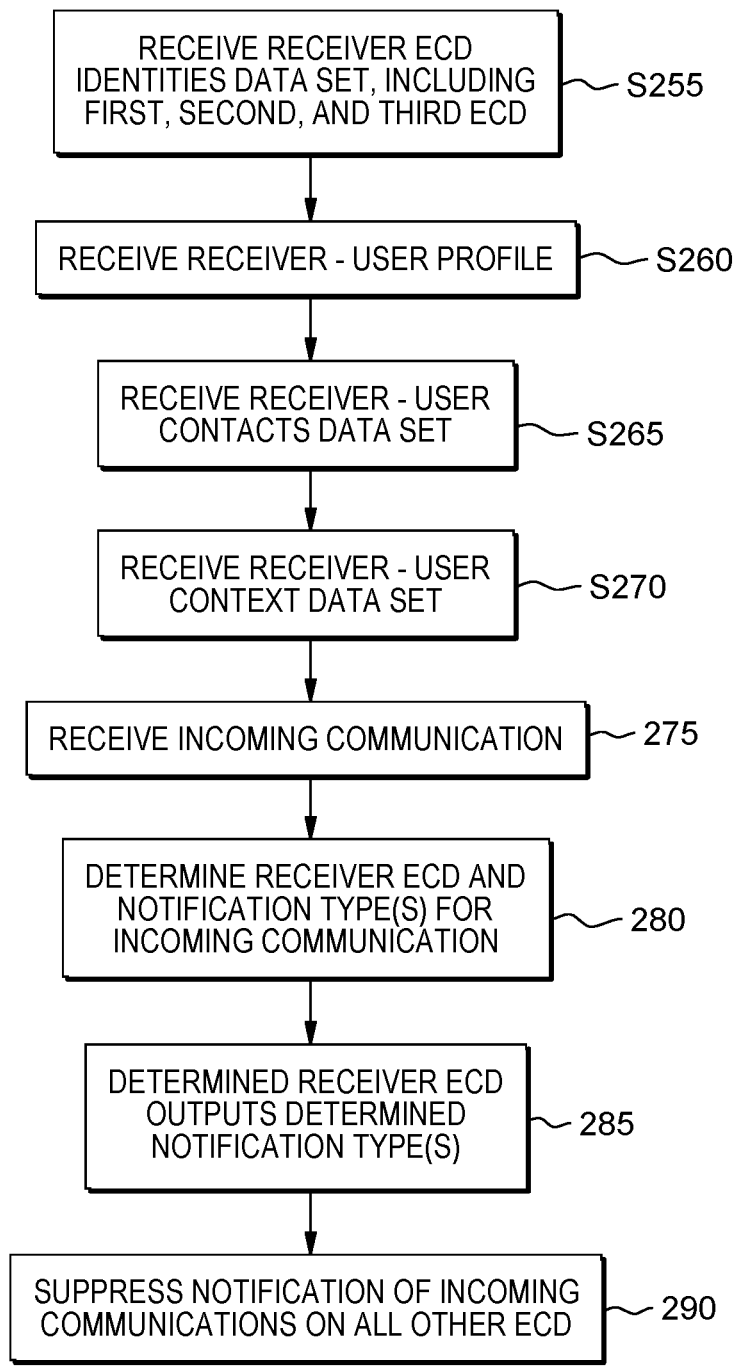
FIG. 2 is a flowchart showing a first embodiment method performed, at least in part, by the first embodiment system.
Figure 3:
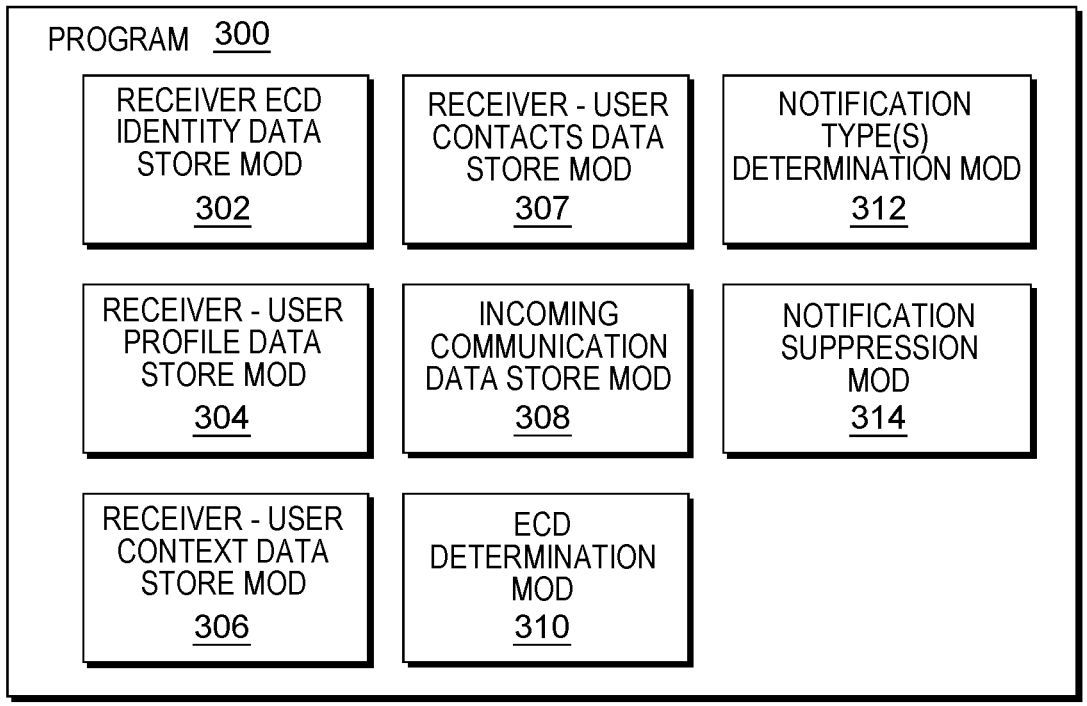
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where receiver electronic communication device (ECD) identity data store module ("mod") 302 receives a receiver ECD identities data set that includes a first, second, and third ECD belonging to a receiver-user (first receiver ECD, second receiver ECD, third receiver ECD). In this simplified embodiment, a receiver-user is a person who has elected to install and operate this simplified embodiment implementation of the present invention on at least some of the ECD that they own and/or control the operation and use of, to manage how they receive electronic communication notifications on their ECD. Also, in this simplified embodiment, an ECD is a computer or personal computer device that is configured to receive electronic communications and generate various types of notifications indicative of an incoming or received electronic communication on/by the ECD. Types of notifications may alternatively be referred to as a notification mode. Some example types of notification modes include: (i) audible/sonic emissions such as music, alarm tones, chimes, ringing, beeping, spoken verbal dialogue, or any other kind of noise emission known in the art for the purposes of notification; (ii) vibration of one or more motors in the ECD; and (iii) presenting an image on one or more displays of the ECD that includes information indicative of an incoming and/or received electronic communication (for example a small icon, information describing the identity of the sender of the electronic communication, information describing some or all of the content of the incoming and/or received electronic communication, or information describing the nature (for example, anticipated importance, urgency, etc.) of the incoming and/or received electronic communication.

Different types of ECD may be capable of gathering different context data or outputting different notification types. For instance, a smartwatch might not have a speaker to output audible emissions, or a microphone to detect audio signals for voice identification but might have one or more display(s) modules to show visual notifications, one or more accelerometer(s) and gyroscope(s) to detect movement context data, one or more global positioning system (GPS) module(s), and one or more vibration motor(s) to output vibration notifications. A smartphone, on the other hand, might have one or more speaker(s) to output audible notifications, one or more microphone(s) to detect audio signals, one or more display(s) to output visual notifications, one or more accelerometer(s) and gyroscope(s) to detect movement context data, one or more GPS module(s), and one or more vibration motor(s) to output vibration notifications. A laptop computer may have one or more speaker(s), one or more microphone(s), one or more display module(s), but might not have GPS modules, accelerometers, gyroscopes, or any vibration motors, which limits the types of context information it can gather and the notification types that it can output, relative to a smartphone. A head-mounted augmented reality (AR) headset might have one or more display module(s), one or more microphone(s), one or more speaker(s), and one or more accelerometer(s) and gyroscope(s) but may lack vibration motors and GPS modules. In this simplified embodiment, the first receiver ECD, a smartphone, has: (i) one speaker; (ii) one microphone; (iii) one display module; (iv) one vibration motor; (v) one accelerometer; (vi) one gyroscope; and (vii) one GPS module. Also, in this simplified embodiment, the second receiver ECD, a smartwatch, has: (i) one display module; (ii) one vibration motor; (iii) one accelerometer; (iv) one gyroscope; and (v) one GPS module. Additionally, in this simplified embodiment the third receiver ECD, a laptop computer, has: (i) one speaker; (ii) one microphone; and (iii) one display module.

In this simplified embodiment, the received receiver ECD identities data set describes the identities of the first receiver ECD as a smartphone corresponding to receiver ECD 106 of FIG. 1, the second receiver ECD as a smart watch corresponding to receiver ECD 102 of FIG. 1, and the third receiver ECD as a laptop computer corresponding to receiver ECD 108 of FIG. 1. Along with the identity of each receiver ECD, the receiver ECD identities data set also describes the notification modes available on each receiver ECD. In this simplified embodiment, the receiver ECD identities data set describes the first receiver ECD, a smartphone, to include one display module, one audio output module (a speaker), and one vibration motor. The second receiver ECD is described by the receiver ECD identities data set to include one display module and one vibration motor. The receiver ECD identities data set also describes the third receiver ECD to include one display module and one audio output module (a speaker).

Processing proceeds to operation S260, where receiver-user profile data store mod 304 receives a receiver-user profile. In this simplified embodiment, the receiver-user profile includes: (i) a first notification rule; (ii) a second notification rule; and (iii) a third notification rule. The first notification rule provides that all audio notifications should be suppressed on all ECD when located inside any campus of an employer of the receiver-user. The second notification rule provides that when the receiver-user is in a meeting located inside any campus of an employer of the receiver-user, all notifications should be suppressed on all ECD until after the meeting. The third notification rule provides, when receiving an urgent communication and vibration motor notifications are suppressed on one or more ECD because of other notification rules: (i) if the receiver-user is wearing a smartwatch, activate a vibration motor in the smartwatch and display a red notification icon on at least one display of the smartwatch; and (ii) if the receiver-user is not wearing a smartwatch and has a smartphone, activate a vibration motor in the smartphone and display a red icon with identity information of the sender on at least one display of the smartphone.

The first notification rule, second notification rule, and third notification rule are exemplary rules for the purposes of explaining this simplified embodiment. In alternative embodiments, different notification rules can be implemented using one or more of: (i) location information; (ii) calendar information; (iii) social media information; (iv) news media information; (v) temporal information; (vi) contact relationship information; (vii) type of communication sent from the sender to the receiver; and (vii) any other types of context information (for example, multiple communication attempts from a single contact in a short period of time, such as three texts from a known contact within a five minute time window). For example, an alternative example notification rule reads: if the current location of the user is outside of their home, suppress all audio-based notification types on each ECD of the user, unless the user's social media indicates that they are in a social setting. Another example alternative notification rule reads as follows: if a microphone module of any ECD of the user detects the proximity of the user's supervisor at their primary employment, suppress all notifications on all ECD of the user resulting from communications sent from anyone affiliated with the user's secondary employment. The foregoing are example alternative notification rules and are not meant as an exclusive list of types of notification rules appropriate for all embodiments of the present invention.

Processing proceeds to operation S265, where receiver-user contacts data store mod 307 receives a receiver-user contacts data set. In this simplified embodiment, the receiver-user contacts data set includes three entries: (i) a first contact identity describing: (a) a name (Person B), and (b) a relationship between the receiver-user and the first contact (a co-worker of the receiver-user at the employer of the receiver-user); (ii) a second contact identity describing: (a) a name (Person C), and (b) a relationship between the receiver-user and the second contact (a personal friend of the receiver-user); and (iii) a third contact describing: (a) a name (Person D), and (b) a relationship between the receiver-user and the third contact (the spouse of the receiver-user).

In alternative embodiments, contact information may include one or more of the following, alone or in addition to the example information above: (i) one or more unique communication ID numbers and/or aliases (such as e-mail addresses, phone numbers, usernames, or other types of communication IDs that uniquely identify individuals or entities in a communication network; (ii) sender priority levels (either numerical, such as one through ten, or descriptive, such as high, low and medium); and (iii) preferred discretion level for notifications relating to communications from a given sender. In some alternative embodiments, the relationship between the receiver-user and a given contact in the receiver-user contacts data set is determined from social media information and/or analyzing the content of historical communications between the receiver-user and the given contact. For example, given the social media ID of a given contact, some alternative embodiments sample the social media information of the given contact and retrieve relationship information available on the social media profile of the given contact, or sample communications between the receiver-user and the given contact that provide information indicative of the type of relationship, such as "Happy Anniversary" posts, or performing machine-logic based image recognition algorithms to identify wedding photographs of a married couple from photographs present on a social media page.

Processing proceeds to operation S270, where receiver-user context data store mod 306 receives a receiver-user context data set. In this simplified embodiment, the receiver-user context data set includes information indicative of: (i) a present location of the receiver-user in GPS coordinates (42.104970, −76.044007); (ii) a work schedule for the receiver-user indicating their typical expected working hours of Monday to Friday, from 9:00 AM US Eastern time to 5:00 PM US Eastern time; (iii) a meeting calendar of the receiver-user for their employment indicating a mandatory meeting for the receiver-user between 10:00 AM US Eastern time to 11:00 AM US Eastern time on Tuesday, May 7, 2019, retrieved from their employer-provided calendar program installed on their work laptop, shown as Receiver ECD 108 of FIG. 1; (iv) the present date and time, Tuesday, May 7, 2019 and 10:30 AM US Eastern time, respectively; (v) average audio levels recorded by the first receiver ECD (the smartphone), shown as Receiver ECD 106 of FIG. 1, for the previous ten seconds, indicating proximity of multiple distinct human voices; (vi) movement activity detected using the accelerometer and the gyroscope of the second receiver ECD (the smartwatch), shown as receiver ECD 102 of FIG. 1, indicating typical movement of a relatively sedentary human; and (vii) which contacts from the receiver-user contacts data set have attempted to send communications to the receiver-user in the past ten minutes and how many communications did each contact attempt to send during those ten minutes ((a) Person B, one, (b) Person C, zero, and (c) Person D, two).

In some alternative embodiments, the receiver-user context data set may include a subset of the above types of data from the simplified embodiment. In some alternative embodiments, the present location of the receiver-user in the context data set is determined by one or more of the following: (i) electromagnetic signal triangulation, such as wireless internet signals (WIFI), radio signals, cellular signals, etc.; (ii) RFID scanning; (iii) identification logging (for example, User A was logged as scanning their personal identification badge to enter Building C); and (iv) network connection logging (for example, an ECD of User A connected to the WIFI network of Building C).

Processing proceeds to operation S275, where receive incoming communication data store mod 308 receives an incoming communication. In this simplified embodiment, the incoming communication is a phone call from Person D using sender ECD 104, a smartphone, beginning at 10:30 AM US Eastern time. Alternatively, any type of electronic communication is suitable for the purposes of being an incoming communication. A non-exhaustive list of such electronic communications includes: (i) SMS messages; (ii) internet-based messaging; (iii) internet-based audio communications such as voice over IP (VOIP); (iv) internet-based video communications; (v) internet mail (e-mail); (vi) social media type broadcasted communications, such as relatively public "posts" available for viewing by a group of users that "tag" a receiver-user; and (vii) images shared over the internet or on a social media platform including communicative information, such as alphanumeric messages overlaid on a photograph. In this simplified embodiment, the incoming communication is sent from a known contact included in the receiver-user contact data set. Alternatively, an incoming communication may be sent from a contact without information in the receiver-user contact data set, and alternative embodiments include determining identity information regarding the source of the incoming communication from internet-based sources, such as initiating an internet search for websites with identical ID information from the incoming message and crawling through the website for corresponding identity information. This corresponding identity information may then be compared to available information about the receiver-user, such as receiver-user provided information, or information from social media profiles of the receiver-user, to determine relationship information, if any, between the corresponding identity information and the receiver-user.

Processing proceeds to operation S280, where ECD determination mod 310 and notification type(s) determination mod 312 respectively determine which receiver-user ECD shall output a notification regarding the received incoming communication at S270 and the notification type(s) output by the receiver ECD regarding the received incoming communication. In this simplified embodiment, the determination of which receiver ECD will output a notification and what notification type is used for the notification is based on the receiver-user profile, the receiver-user contacts data set, and the receiver-user context data set. In this simplified example embodiment, ECD determination mod 310 consults the receiver-user profile for applicable notification rules based on the receiver-user context data set. An objective of this simplified embodiment is to output the least discreet notification constrained by the receiver-user profile, the receiver-user contacts data set, and the receiver-user context data set. Restated alternatively, an objective of this simplified embodiment is to output notification types with the highest likelihood of being noticed by the receiver-user while constrained by the receiver-user profile, the receiver-user contacts data set, and the receiver-user context data set. Other embodiments may be guided by different principles. In this simplified embodiment, the three notification rules present in the receiver-user data set are the first notification rule, the second notification rule, and the third notification rule.

The first notification rule, discussed above, stipulates that when the receiver-user is located within any campus of their employer, audio type notifications should be suppressed on all receiver ECD (such as receiver ECD 102, receiver ECD 106 and receiver ECD 108). Upon comparing known geographic coordinate ranges for campuses of the employer of the receiver-user against the present location coordinates received in the receiver-user context data set, conditions for the first notification rule are met because the present location coordinates from the receiver-user context data set are within the range of coordinates recognized as a campus of the employer of the receiver-user. Additionally, this condition is confirmed by the work schedule and the present date and time from the receiver-user data set, which includes that: (i) the receiver-user's work schedule is Monday through Friday, 9:00 AM US Eastern time to 5:00 PM US Eastern time; (ii) the present date is Tuesday, May 7, 2019, which is within the work days indicated in the work schedule; and (iii) the time is 10:30 AM US Eastern time, which is within the work hours indicated in the work schedule. Alternatively, if the present location of the receiver-user was determined by other means (for example, detecting WIFI network signals from access points belonging to the employer), the comparison of the present-location of the receiver user against the conditions for this example rule would be simplified (if employer WIFI signals detected by receiver ECD, then receiver-user, or that particular ECD of the receiver-user, is located in or near a campus of the employer).

With the conditions of the first notification rule met, the first receiver ECD (receiver ECD 106), a smartphone with a speaker, is determined to be marked for suppressing audio type notifications in response to the incoming communication but, with other types of notification available (vibration, visual), is still available as a potential ECD for outputting a notification responsive to the incoming communication. The second receiver ECD (receiver ECD 102), a smartwatch, does not have a speaker and is therefore ignored for the purposes of this first rule and is considered a potential ECD for outputting a notification responsive to the incoming communication. The third receiver ECD (receiver ECD 108), a laptop computer with a speaker, is similarly determined to be marked for suppressing audio type notifications in response to the incoming communication, however with other types of notification available (visual), is still available as a potential ECD for outputting a notification responsive to the incoming communication.

The second notification rule, discussed above, stipulates that when the receiver-user is in a meeting located inside any campus of an employer of the receiver-user, all notifications should be suppressed on all ECD until after the meeting. Noting that the conditions of the first notification rule are met (the receiver-user being located within a campus of the employer of the receiver-user), part of the conditions for the second notification rule are already determined to be met. The remaining condition is tested for by consulting the meeting calendar of the receiver-user from the receiver-user context data set and the present date and time from the receiver-user context data set, which indicate: (i) the receiver-user has a mandatory meeting from 10:00 AM US Eastern time to 11:00 AM US Eastern time on Tuesday, May 7, 2019; and (ii) the present date and time is Tuesday, May 7, 2019 and 10:30 AM US Eastern time, respectively. As 10:30 AM US Eastern time is between 10:00 AM US Eastern time and 11:00 AM US Eastern time, this condition is determined to be met. As a result of this condition, all notifications on all receiver ECD (receiver ECD 102, receiver ECD 106 and receiver ECD 108 of FIG. 1) are marked for suppression, at least until one or both of the conditions abate, and the second notification rule is not applicable.

Alternatively, meeting status of the receiver-user can be ascertained by performing voice analysis on audio signals recorded by one or more receiver ECD to detect voices of known co-workers, supervisors, executives, or the presence of one or more unknown individuals speaking within the proximity of the receiver-user.

The third notification rule, discussed above, stipulates that when, upon receiving an urgent communication and vibration motor notifications are suppressed on one or more ECD because of other notification rules: (i) if the receiver-user is wearing a smartwatch, activate a vibration motor in the smartwatch and display a red notification icon on at least one display of the smartwatch; and (ii) if the receiver-user is not wearing a smartwatch and has a smartphone, activate a vibration motor in the smartphone and display a red icon with identity information of the sender on at least one display of the smartphone. In this simplified embodiment, an urgent communication is determined to be three attempted incoming communications from a single sender in a ten-minute window, where the relationship between the receiver-user and the incoming communication sender is either spouse, parent or child. The third notification rule has several conditions. A first condition of this third notification rule requires determining if the incoming communication is urgent. The incoming communication is a phone call from Person D using Sender ECD 104, a smartphone. Per the receiver-user context data set and the receiver-user contacts data set, Person D is the spouse of the receiver user and the incoming communication is the third communication attempt by Person D in the past ten-minutes. As this meets the definition of an urgent communication from above, the first condition determined to be met. A second condition of this third notification rule requires determining if the vibration type notifications are suppressed on one or more receiver ECD. As the second notification rule is presently active, suppressing all notifications on all receiver ECD (including vibration type notifications), the second condition is determined to be met.

With the first two conditions of the third notification rule met, S280 proceeds to consider subpart (i) of the third notification rule, which requires determining if the receiver-user is wearing a smartwatch. In this simplified embodiment, the receiver-user context data set includes movement activity detected using the accelerometer and the gyroscope of the second receiver ECD (the smartwatch), shown as receiver ECD 102 of FIG. 1, indicating typical movement of a relatively sedentary human. This information indicates that someone, presumably the receiver-user, is wearing a smartwatch (receiver ECD 102), leading to a determination that subpart (i) of the third notification rule is met. As subpart (i) is determined to be met, subpart (ii) is not considered in this simplified embodiment, and receiver ECD 102 is selected for outputting a notification regarding the incoming communication. Alternatively, if the receiver-user context data set indicated that there was no movement activity from receiver ECD 102, subpart (ii) of the third notification rule would be considered and upon determining that receiver ECD 106 is a smartphone, receiver ECD 106 would be selected for outputting a notification regarding the incoming communication. In this simplified embodiment, if the incoming communication was from Person B or Person C, no receiver ECD would be selected for outputting an incoming communication because the third notification rule would not apply, based on the incoming communication not qualifying as urgent, leaving the first notification rule and second notification rule determining that no receiver ECD should output any notification type.

Notification type(s) determination mod 312 also consults the first notification rule, second notification rule, and third notification rule, working through each in a similar manner to ECD determination mod 310 above, reaching the third notification rule and determining that a vibration-type notification and a visual type notification are appropriate for the current context and the incoming communication. More specifically, the visual type notification is to be a red icon, which is indicative of the determined urgency of the incoming communication, with the icon including information indicating the identity of the sender of the incoming as well as information indicating why this communication was determined urgent (third incoming communication in ten minutes). In this simplified embodiment, if the incoming communication was from Person B or Person C, no notification type would be selected for outputting an incoming communication because the third notification rule would not apply, based on the incoming communication not qualifying as urgent, leaving the first notification rule and second notification rule determining that no receiver ECD should output any notification type. Alternative embodiments include alternative means of determining urgency, such as monitoring news broadcast sources for information indicative of emergencies at or near locations related to known contacts from the receiver-user contacts data set and flagging incoming communications from contacts that are anticipated to be near active emergencies, and having notification rules stipulating that urgent incoming communications be handled differently than non-urgent communications. Alternatively, urgency is not a binary determination, but a scalar variable based upon the severity of the active emergency and the relationship between the receiver-user and the contact.

Alternatively, determining notification type(s) by notification type(s) determination mod 312 of FIG. 3 includes adjusting audio levels of the audio type notification output to match or slightly exceed average audio levels recorded by a receiver-user ECD for a historical time window (for example, the immediately previous ten seconds), to tailor the optimal output volume of the notification based on the current average volume levels in the proximity of the receiver-user to increase the likelihood that the audio type notification will be heard by the receiver-user without raising the volume higher than necessary and/or desired when the receiver-user is in quieter surroundings.

Figure 4:
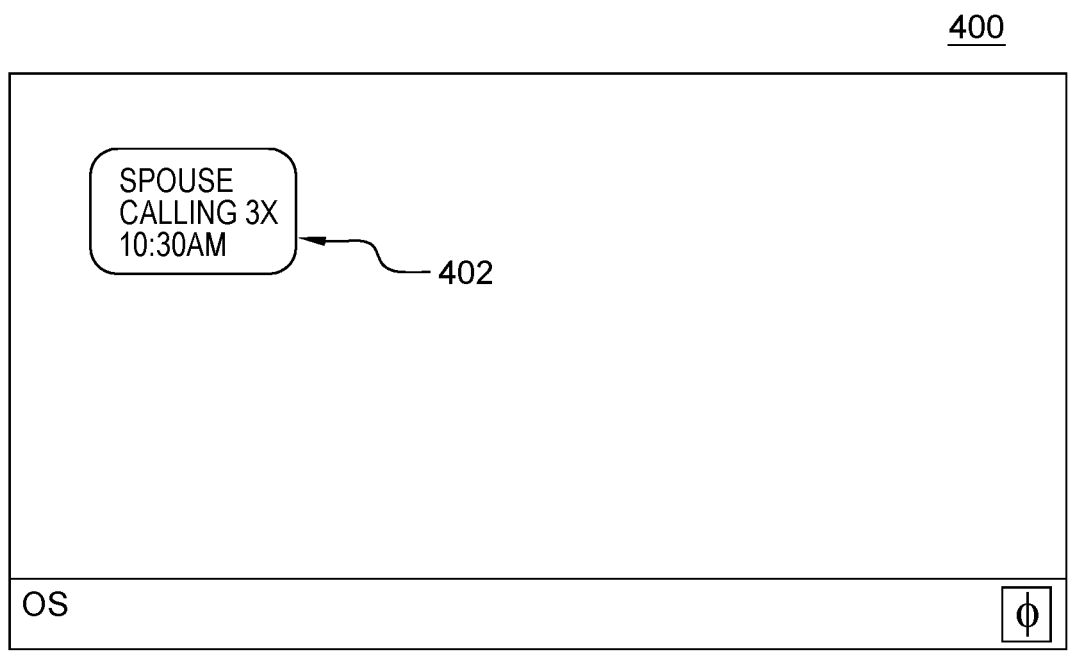
FIG. 4 is a screenshot view generated by the first embodiment system.

Processing proceeds to operation S285, where receiver ECD 102 outputs a notification as determined by modules 310 and 312 at operation S275. In this simplified embodiment, receiver ECD 102 (smartwatch) of FIG. 1 activates vibration motor 216 of FIG. 1, outputting a vibration pulse, and also outputs a red notification icon, such as icon 402 of screenshot 400 of FIG. 4, on display device 212 of FIG. 1. Alternatively, multiple receiver ECD may output a notification of one or more type(s) for a given received incoming communication. As a further alternative, different ECD may output different notification types based upon the context. For example, using a smartphone and a smartwatch, a receiver-user might setup a profile that includes rules for having the smartwatch output only a vibration type notification when an incoming communication is received, and the smartphone to output only a visual type notification, instead of any individual device outputting multiple notification types. This may be advantageous for privacy reasons, as a smartwatch display may be openly visible at nearly all times that a receiver-user is present in the company of other people, given how a smartwatch is worn, but is also in direct contact with the body of the receiver, increasing the effectiveness of vibration type notifications. In some alternative embodiments, a vibration based notification using one or more vibration motors may have a variable intensity of vibration based on the context of the receiver-user, for example, vibrating more intensely during physical activity and/or loud environments and less intensively while stationary, quiet, and/or not in a meeting.

Processing proceeds to operation S290, where notification suppression mod 314 suppresses notification output for the received incoming communication stored in mod 308 on receiver ECD 106 and receiver ECD 108, as determined at S275 by ECD determination mod 310 and notification type determination mod 312. In this simplified embodiment, receiver ECD 106 (smartphone) and receiver ECD 108 (laptop) output no notifications of any type in response to the incoming communication stored in incoming communications data store mod 308.

III. Further Comments and/or Embodiments

Some embodiments of the present invention recognize the following facts, potential problems and/or potential areas for improvement with respect to the current state of the art: (i) it often happens that people get phone calls or messages (for example SMS, IM, sometimes referred to as electronic communications) during inappropriate circumstances (for example, during an important meeting or an unintended audience, etc.); (ii) such calls and/or messages can cause unpleasant personal and/or business consequences; (iii) one state of the art solution is to mute a device that might receive these electronic communications; (iv) one shortfall of this solution is that traces of the undesired activity will still be present when activated; (v) for example, when unlocking a mobile phone, information about a missed call will appear and can be seen by other individuals nearby; (vi) an alternative to muting the device is turning the device off, which will block all incoming communications; and/or (vii) turning off a device will block expected and/or desired electronic communications that may be helpful in certain contexts/circumstances.

Some embodiments of the present invention may include one, or more, of the following features, characteristics and/or advantages: (i) control incoming electronic communications (such as calls/messages) including SMS, IM messages, or any other network related communication to a plurality of computer device(s) (for example, cell-phones, mobile-phones, smartphones, tablets, laptops, etc.) based on a user's preferred settings; (ii) the preferred settings of selective restrictions placed on the plurality of computer device(s) (for example, all of the smart phones and laptops owned and controlled by a single user) can involve multiple variables (for example, geography, time of day, and/or identity of communication sender); (iii) selectivity in presenting incoming communication notifications based, at least in part, on geographical location as determined by geo-location technologies (for example, Global Positioning System signals (GPS)) and/or contextual clues (for example, analyzing the content of social media posts made by the user); (iv) another example includes selectively handling (such as filtering) incoming communications based, at least in part, upon identity of the communication sender in addition to geographic location of the communication receiver (for example, the user (receiver) may not want to receive notifications from one employer during a time that they are on the premises of another employer); (v) a user who is the target recipient of electronic communications handled/screened by embodiments of the present invention can view these screened electronic communications at a later time after they have departed from restricted geographical locations (for example geographical location(s) associated with a user's primary or secondary employment); and/or (vi) temporal or event based restrictions are also possible, either instead of or in addition to other types of restrictions (for example, checking up with calendar activities to apply restrictions on electronic communications from personal/non-employment related contacts during employment-related meetings while located on employer premises).

Some embodiments of the present invention may include one, or more, of the following features, characteristics and/or advantages: (i) a second approach can be used independently or together with the above approach; (ii)

restriction can be setup based on a user's proximity to one or more specified individuals; (iii) a user can customize rules that are executed when they are close to one or more specific individuals, restricting incoming electronic communications to one or more computer devices on their person; (iv) this includes restricting electronic communications differently based on the computer device; (v) and/or restricting electronic communications differently based on the sender/origination of the electronic communication; (vi) for example, a user who is proximate to their boss at their primary employment and does not want to view electronic communications from their secondary employment while in the presence of their boss at their primary employment; (vii) there are multiple ways to determine proximity to specific individuals, including shared geo-location information and voice recognition; (viii) a user will be able to check the electronic communications (such as calls and/or messages) after leaving the proximity of the specified individual(s); (ix) a system that can identify a given situation/context and the profile of a contact sending the communication that follows customized settings and decides how to handle a given electronic communication; (x) an example of handling an electronic communication in this example embodiment include sending the electronic communication to an alternative device, such as a smart watch; (xi) users can select a degree of how much information about a received electronic communication is presented, such as an acknowledgement of a communication occurring, a type of communication received, a name of an originating contact, or no information at all; (xii) alternatively, a user can select to have an icon present when an electronic communication was received; (xiii) the icon can contain information indicating that an electronic communication was received; (xiv) the icon can further include information indicating the type, urgency and/or priority of the received electronic communication; (xv) the urgency/priority of the electronic communication can be determined by analyzing the content and context of the electronic communication; (xvi) for example, a user is in a business meeting and receives two electronic communications, a first communication from a friend inviting them to meet up and a second communication message from the user's spouse that their child is sick; and/or (xvii) in this example, processes running on the background will be able to review the content of the notifications and by keywords/context/profile analysis decide to give different prioritization to each notification, where the first communication from the friend will result in no visible icon displaying upon receipt of the electronic communication, while the second communication from the wife will display an icon that is colored red/specifically marked and highlighted.

Some embodiments of the present invention may include one, or more, of the following features, characteristics and/or advantages: (i) control over the incoming calls, messages and notifications by a user based on customized settings; (ii) increased safety for the user by reducing unwanted calls/messages/notifications; (iii) ability to not just restrict all calls/messages/notifications, but filter each message through application of specific settings for each message/occasion/contact; (iv) detecting the situation (context) includes detecting the user situation and profile application for the user; (v) dynamic profile aggregation (for example, detecting 3 people together triggers a different situation/response than 2 people together); (vi) the system may use a priority based algorithm to decide which profile elements/settings take priority; (vii) updating of situation profile based on social media relationships; (viii) requesting consent from the user to use social media relationships to update situation profile; (ix) based on the situation/context, determine which device the notification will be sent to; (x) devices could include computers, smartphones, smart watches, and other wearable devices; (xi) determine how the notification will be delivered based on the situation, including full text, augmented text, vibration, contextual icon varying in size and/or color, delayed display, and no-display; and/or (xii) inferring the importance of message based on multiple factors which may include sender, frequency, content (if textual, by scanning for keywords), as well as social media events.

Some embodiments of the present invention may include one, or more, of the following features, characteristics and/or advantages: (i) a system that will add environmental based restrictions; (ii) blocking the appearance of calls on mobile devices in certain situations; (iii) embodiments include systems and methods for determining the priority of a notification on a mobile device using machine learning; (iv) other aspects include selectively displaying or emphasizing notifications based on the priority of a notification; (v) the prioritization system is dynamic, based on the user's location and role and relationship of other persons who are in close proximity to the user; (vi) the same message from the same person can be ranked differently according to the situation, such that the learning part is focused on learning and understanding the user's situation and, based on the user's situation, notifications and alerts will behave differently; (vii) as an example, a user doing an important presentation to a client so all the messages usually are ok to show to the user will be automatically stopped and hidden as long as the user still in the meeting room in proximity to a customer; (viii) trying to solve the problem from the received side; (ix) upon receipt of a notification, the receiver's device determines if the alert or notification should be presented to the user; (x) if the sender didn't select (for example, the sender does not have access to the receiver's calendar, or human error, etc.) where and when the receiver will have every meeting throughout the day, the system will still prevent receipt of unwanted notifications by the receiver until they are more convenient for the receiver to consume; (xi) taking into account with whom the user/receiver/recipient is in close proximity to when they receive the notification; and (xii) dynamically analyze the situation of the recipient/receiver to decide based on the actual situation how the message/notification should be presented or if it should not be presented until a later, more convenient time.

An embodiment of a method, for use with a first user's telephone device, according to the present invention includes the following steps (not necessarily in the following order): (i) receiving a first set of geographical locations; (ii) receiving a first telephone number associated with a first caller; and (iii) setting a first machine logic based rule which specifies that if a telephone call from the first telephone number comes in when the user is within the first set of geographical locations, then no call notifications will pop up on and no ringing will occur on the first user's telephone device.

Some embodiments of the present invention may include one, or more, of the following features, characteristics and/or advantages: (i) a method for managing incoming electronic communications (e.g., phone calls, voicemails, text messages) in accordance with notification levels (e.g., vibrate is lower level than ringing) on a mobile device based on a dynamically adjustable, situationally-aware aggregate profile that takes into account a variety of contextual individual profiles; (ii) this includes a separate individual profile for each of: (a) the user of the mobile device, and (b) at least two additional people that are detected within a proximity of the user; and (iii) each individual profile includes at least: (a) the identity of that individual, (b) the status (e.g., busy, annoyed) of that individual, and (c) the relationships of that individual with the other individuals (e.g., spouse v. co-worker).

An embodiment of a method, for use with a first user's telephone device, according to the present invention includes the following steps (not necessarily in the following order): (i) receiving a first set of geographical location(s) (for example, an international enterprise's offices worldwide); (ii) receiving a first telephone number associated with a first caller; (iii) setting a first machine logic based rule which specifies that if a telephone call from the first telephone number comes in when the user is within the first set of geographical location(s) then no call notifications will pop up on and no ringing will occur on the first user's telephone device; (iv) receiving, by the first user's telephone device, a first call from the first telephone number; (v) responsive to the receipt of the first call, determining that the first user's telephone device is located within the first set of geographical location(s); and/or (vi) responsive to the receipt of the first call and further responsive to the determination that the first user's telephone device is located within the first set of geographical location(s), applying the first machine logic based rule so that no call notifications will pop up on and no ringing will occur on the first user's telephone device in response to the first call.

Some embodiments of the present invention may include one, or more, of the following features, advantages, operations and/or characteristics: (i) does not block all the notifications in a selected area, but rather provides for selective blocking within a predetermined area (for example, selective blocking within a certain building); (ii) provides real time machine logic based analysis of the situation (for example, where is the user and whom she is with) to determine whether a given notification will be presented on the user's device; and/or (iii) uses machine logic to decide upon which device a given notification will be shown (for example, an important social media message from one's spouse that occurs while one is presenting using a laptop to a customer may be prevented from being presented on the screen of the laptop and an associated projector, but, rather, may be displayed in the small screen of the one's smart watch).

Some embodiments of the present invention may include one, or more, of the following features, advantages, operations and/or characteristics: (i) the prioritization system is dynamic, based on the user's location and role and relationship of other persons who are in close proximity to the user; (ii) the same message from the same person can be ranked differently according to the situation, so the learning part is different instead of learning which type of alerts are more important for the user to rank them higher; (iii) some embodiments of the present invention are focused on learning and understanding the user's situation and, based on the users situation, notification and alerts will behave differently; (iv) as an example of the foregoing, a user is conducting an important presentation to a client, so all of the messages that usually are ok to show to the user will be automatically stopped and hidden while the user still in the meeting room in proximity to the client, and presented to the user after leaving proximity to the client; (v) the receiver's device, upon receipt of a notification, determines if the alert or notification should be presented to the user (this may sometimes be referred to as a "receiver side solution"); (vi) some embodiments do not depend on location information being assigned to the user's calendar entry (for example, if the sender didn't select (does not have access to the receiver calendar, human error, etc.) where and when the user will have every meeting in the day, the user still will not receive unwanted notifications; and/or (vii) some embodiments take into account with whom the user is in close proximity to when they receive the notification.

Some embodiments of the present invention may include one, or more, of the following features, characteristics and/or advantages: (i) an embodiment of the present invention includes the following steps: (a) detection of the situation in which the user is in (such as location, proximate people, time, calendar appointments, etc.), (b) identifying the situation profile(s) of the user to be used, (c) generate a dynamic situation profile based on the aggregation of multiple situation profiles through prioritization rules, and (d) create an application view/perspective that applies the dynamic situation profile; (ii) several components are used for determining a user's situational context, selecting the appropriate rules to apply, determining whether to allow the notification, phone call or message, and determining which device or devices to send it to; (iii) some embodiments depend on many inputs that are used to determine the user's situation; (iv) user detection determines identities for each person in close proximity to the user; (v) facial recognition, voice recognition, GPS and other contact identification solutions can be leveraged to determine identities of proximate persons to the user; (vi) incoming electronic communications such as phone calls, skype calls, messages from text or any social media platform and system notifications will be monitored by an embodiment system; (vii) time of day is another important input, as it is one attribute of a situation profile that a user will define; (viii) by knowing the user's location the system is able to further refine the user's context which may influence dynamic profile selection; (ix) social media profile, status, friends and posts are another input; (x) this information helps the system understand relationships between the user and other contacts and people in proximity; (xi) the information also helps determine what are urgent or important issue the user is experiencing; (xii) in addition to what issue, it will also aid in determining which contacts are connected with the present issue; and (xiii) the monitoring platform will know when each input component is triggered and then can call an orchestrator component, shown below, with the appropriate event.

Some embodiments of the present invention may include one, or more, of the following features, characteristics and/or advantages: (i) each profile consists of a name, a list of triggers and a list of actions taken when the profile is activated; (ii) an example trigger can be but not limited to the proximity to a person, such as a supervisor or a spouse, or a change in situation such as leaving a location of employment or entering a home, etc.; (iii) for each profile the user defines the list of actions that impact the user devices when the profile is activated (mute the sound, block all of the calls, hide certain applications (apps), e-mails, SMS messages, etc.); (iv) a situation profiles database (DB) includes a list of all possible situations a user might have that are important for the user; (v) this can be based on the user's location, calendar entries, performed activities (such as jogging or driving), etc.; (vi) a detection of situation component listens for events to occur; (vii) an active profiles database (DB) component reflects profiles and settings applied to the profiles at a given moment; (viii) for example, when a user is in a meeting in close physical proximity with their colleagues, all notifications of electronic communications to their smart phone will be screened/ignored, but their smart watch device will vibrate; (ix) the moment the user leaves the office and begins driving to another location, another profile will activate that will simply mute all notifications of electronic communications; (x) detection of profile components may analyze incoming signals and check if there is any specific profile applicable for this signal; (xi) for example, a call from the user's work colleague is passing through on the user's phone, causing this component to detect which actions this signal should trigger based on the profile; (xii) a consolidated profiles engine component analyzes activities that need to be triggered when one or more activity and/or profile clash; (xiii) for example, when a user has set up to mute all of the notifications for electronic communications during the night hours and ignore notifications from colleagues when the user is with their family; and/or (xiv) this component will consolidate these two options into the one most restricted action for the call from the colleague when the user is at home with his family for the night.

Some embodiments of the present invention may include one, or more, of the following features, characteristics and/or advantages: (i) an importance calculator module measures the importance of an event and it can trigger in certain cases different actions than the one selected by the user; (ii) an example of this is when a user selects to block all personal calls when they are at work, but the system (such as the detection of situation component) detects abnormal behavior from their child, such as the child calling several times in a short period, a red alert in the news, a dramatic change in sentiments of social media around the location of their child, etc.; (iii) the system can show a color coded notification for the user that will show them that something abnormal is happening right now and the user can choose to view this notification in greater or complete detail; (iv) a device selection component is responsible for determining all available devices for the user, including devices that may provide input and devices that receive electronic communication notifications; (v) this device selection component may also determine, based on a user's settings, to take certain actions for one or more of the devices for a particular notification; (vi) for example, a call from skype can be setup to be completely ignored on a user's smartphone, but might send a vibration signal to their smart watch, with no restrictions for their home desktop; (vii) devices may include any portable or fixed device with connection to one or more networks and a basic operating system; (viii) devices belonging to the same user would have a single sign in for the usage of different applications; for example, an Android™ smartphone, a laptop, a tablet all having a Facebook™ application installed and the user has the same level of information/notifications for Facebook™ on each device; (ix) an orchestrator component provides some core functionality for the system, including orchestrating all of the communications directed to the user and their devices, activation and deactivation of profiles, detecting changing situations, and coordinating the change of the notification user interface (notification UI); (x) a notification UI component will show a simple color coded notification in the screen of one or more of the user's devices; (xi) for example, a transparent circle in the top right corner of a screen of a user's device; (xii) this notification UI will change according to the number of the profile activated and the determined importance of the events happening in real time; (xiii) another example is that the circle changes to transparent green when incoming SMS messages or tweets from Twitter™, etc. are determined to have a lower metric of importance; and/or (xiv) when there is a big negative event happening and the system detects that a family member is anticipated to be very close to the big negative event (such as scheduled to be at a nearby school, workplace, concert, doctor appointment, etc.) and is also attempting to call and/or send SMS messages to the user, the circle changes to a red color.

Figure 5:
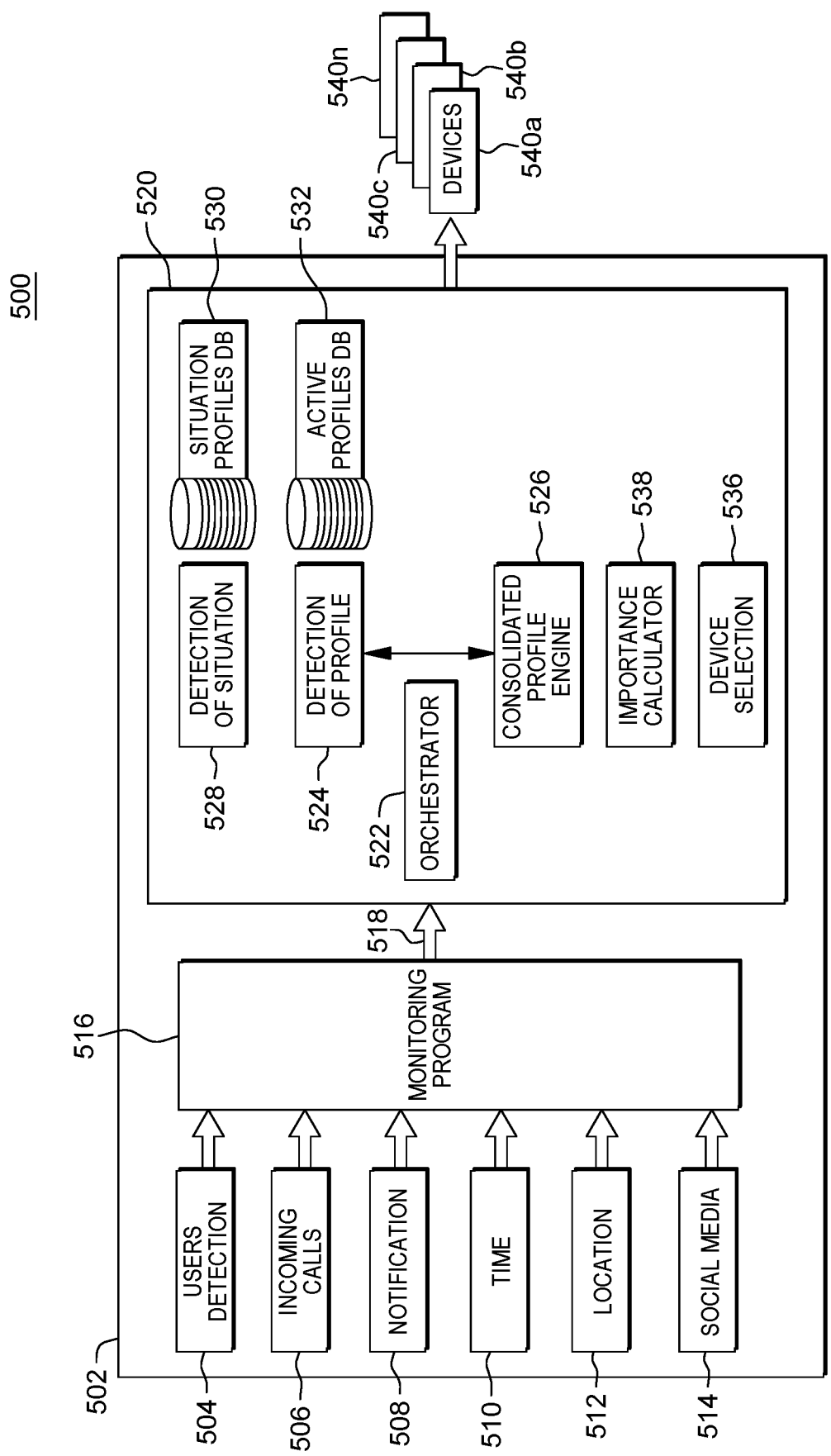
FIG. 5 is a block diagram of a first embodiment of a system according to the present invention.

Aspects of the present invention will now be described with respect to FIG. 5, showing a functional block diagram of component model 500.

Block 502 describes a dynamic communication management system according to aspects of the present invention.

Block 504 describes one or more modules for detecting individuals in proximity to the user, including facial recognition, voice recognition, and GPS location, which is input into monitoring platform 516.

Block 506 describes one or more modules for detecting incoming calls to a user via cellular networks and/or internet protocols, including descriptive information about the identity of the caller such as the contact name, phone number, relationship to the user (such as favorite contacts, or family) and the type of call, and provides this information as input to monitoring platform 516.

Block 508 describes notifications generated from applications (APPS), social media platforms (including communications from the platform to the user or communications among and between users), SMS messages, and other notifications from other types of electronic communications, as well as descriptive information about the notifications such as the identity of the source of the communication, which platform or application it occurred on, relationship to the user, and other types of information. This information is then provided to monitoring platform 516 as input.

Block 510 describes one or more modules for determining temporal circumstances for the user and electronic communications, such as the current time at the user's location, what the user's calendar indicates they are doing, specified time windows defined by the user, etc., and provides that information as input to monitoring platform 516.

Block 512 describes one or more modules for monitoring the location of the user by collecting and analyzing information from one or more sources including GPS signals of computer devices on the user's person, cellular triangulation of one or more of the user's computer devices on their person, wireless internet signal triangulation of one or more of the computer devices on the user's person, etc., and provides that information as input to monitoring platform 516.

Block 514 describes one or more modules for collecting and analyzing information from one or more social media platforms and applications used by the user, including some or all of the following: (i) identity of the user; (ii) place of employment of the user; (iii) contacts of the user; (iv) relationships between contacts of the user and the user; (v) location of the user; and/or (vi) meeting status of the user. In some embodiments, these modules request user permission before accessing social media information about the user. This information is then sent to monitoring platform 516 as input.

Block 516 describes one or more monitoring platform module(s) that aggregates information about the user and electronic communications that the user receives. This includes When an event occurs, such as the user receiving an SMS message, the event information along with relevant context information, such as information collected by modules described by blocks 504 through 514.

Arrow 518 describes events transpiring as detected by the monitoring platform 516.

Block 520 describes a notification management system, including components 522 through 538, including orchestrator component 522, detection of profile component 524, consolidated profiles engine 526, detection of situation component 528, situation profiles database (DB) component 530, active profiles database (DB) component 532, device selection component 536, and importance calculator component 538.

Block 522 describes an orchestrator component, which orchestrates all of the electronic communication notifications to the user's one or more devices, oversees activation and deactivation of profiles, determines changes to the user's situation based on inputs, and coordinates changes of the notification UI, if applicable.

Block 524 describes a detection of profile component that analyzes incoming signals and inputs and determines if there is a profile appropriate to the analyzed information.

Block 526 describes a consolidated profiles engine component, which analyzes the activities that need to be triggered when more than one profile or activity clashes, and determines a consolidated profile covering the demands of both settings.

Block 528 describes a detection of situation component, which monitors and detects incoming events to occur.

Block 530 describes a situation profiles DB component, which contains the situation profiles configured by the user. Each profile may include a profile name, a profile identification number, one or more triggering situations, and one or more rules governing actions to take with regard to one or more types of notifications for electronic communications on one or more user devices.

Block 532 describes an active profiles DB component, containing all of the rules of the situation profile that is currently active in the given situation across one or more of the user's devices.

Block 536 describes a device selection module which selects which device should receive a notification of an electronic communication according to the active profile in block 532 and delivers the notification to the selected device in the manner outlined in the active profile of block 532.

Block 538 describes an importance calculator component that evaluates the importance of incoming electronic communications and determines an importance indicator. Some of the techniques that importance can be determined by the importance calculator include parsing text for keywords, identifying communication attempts from an individual contact, identifying the relationship of the contact to the user (such as employment supervisors and family members, etc.), parsing voice communications for keywords, analyzing event information from social media and other news sources relevant to the contact. This importance indicator is then provided to the orchestrator for use in determining if and how the situation and profiles should change.

Block 540a through 540n describe a plurality of user computer devices, such as laptops, smartphones, smart watches, and other types of computer devices, belonging to a given user.

A typical "location profile" of a typical user will now be set forth. In this example the profile includes all the locations for a company in this example called Example Corp:

```
{
"Company Office Address": "Example Corp",
"Residential Address": "N/A",
"GPS Coordinate": "N/A",
```

-continued

```
"Indoor GPS Coordinate": "N/A",
}
```

Another typical "location profile" of another typical user will now be set forth. In this example, the profile applies for two example locations only.

```
{
"Company Office Address": "N/A",
"Residential Address": "N/A",
"GPS Coordinate": [ (42.105426, −76.044783, 42.104194, −76.043378) | | (49.226018, 16.576487, 49.223454, 16.579631) ],
"Indoor GPS Coordinate": "N/A",
}
```

A typical "activity profile" of a typical user will now be set forth. This profile applies in all instances where the status is meeting in a calendar-type computer program (for example, Lotus Notes™ or Google Calendar™):

```
{
"Status from Calendar": { ("Calendar App1":"Meeting") | | ("Calendar App2":"Meeting") },
"Status from Instant Messenger Client": "N/A",
"Status from Social Media": "N/A",
"Status Edited by User": "N/A",
}
```

A typical "nearby people profile" of a typical user will now be set forth. This profile will be activated if we track a user location from a navigation computer program Nav1 (for example, Waze™ App) with the pseudonym @JaneRoe close by:

```
{
"First name": "Jane",
"Last name": "Roe",
"Phone Number": "001 774164823",
"Social Media Platform1": "N/A",
"Social Media Platform2": "N/A",
"Nav1": "@JaneRoe"
}
```

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Personal computer device: a mobile computer belonging to a specific person that is generally kept on their person, such a smart phone, wearable computer device, augmented reality headset, or implantable and/or bionic computer components.

What is claimed is:

1. A computer-implemented method (CIM), the method comprising:
   receiving a receiver-user device data set indicative of an identity of a plurality of electronic communication device(s) (ECD) belonging to the receiver-user;
   receiving a receiver-user contacts data set including information indicative of an identity of a plurality of contact(s);
   receiving a receiver-user profile data set including a plurality context-contact management rule(s), where each rule includes information indicative of how incoming electronic communications directed to the receiver-user from one or more contact(s) should be managed on the plurality of ECD responsive to one or more conditions present in a situation context of the receiver-user, and each rule includes a priority value indicating relative priority compared to other rules;
   receiving a receiver-user context data set including information indicative of a present situation context of the receiver-user;
   receiving, from at least one ECD, at least one audio stream(s) corresponding to audio recording of a local environment of the at least one ECD;
   determining, by machine logic, information indicative of proximity between the receiver-user and one or more individual person(s) associated with contacts of the receiver-user contacts dataset based, at least in part, on computer voice recognition identification of human speech corresponding to the one or more individual person(s) associated with contacts of the receiver-user contacts dataset in the at least one audio stream(s);
   modifying, by machine logic, the receiver-user context data set to include the information indicative of proximity between the receiver-user and one or more individual person(s) associated with contacts of the receiver-user contacts dataset;
   selecting, by machine logic, at least one context-contact management rule from the receiver-user profile data set for present incoming electronic communication management operations based, at least in part, on the receiver-user context data set;
   receiving an incoming electronic communication (IEC) directed to the receiver-user from a contact identified in the receiver-user contacts data set;
   presenting an image on one or more display(s) of the at least one ECD that includes an icon corresponding to the identity and an urgency of the IEC;
   suppressing notifications for the IEC on remaining ECDs until a present context of the receiver-user context data set indicates a relaxed discretion level, and
   managing, by machine logic, the IEC based, at least in part, on the selected at least one context-contact management rule(s), including:
   determining, by machine logic, an IEC context data set based, at least in part, on the IEC, the receiver-user contacts data set, where the IEC context data set includes at least one of the following: (i) information indicative of content of the IEC, and (ii) information indicative of a nature of relationship between the contact identified in the receiver-user contacts data set;
   wherein the information indicative of a present situation context of the receiver-user includes information indicative of a present geographic location of the receiver-user.

2. The CIM of claim 1, wherein the geographic location of the receiver-user is determined based on at least one or more of: (i) Global Positioning System (GPS) coordinates, (ii) receiver-user electronic calendar entries, and (iii) social media location information provided by the receiver user.

3. The CIM of claim 1, wherein managing the IEC further comprises:
   determining a discretion level value for the IEC based, at least in part, on: (i) the plurality of ECD, (ii) the IEC context data set, and (iii) the selected at least one context-contact management rule(s);
   determining a most appropriate notification output for the IEC based, at least in part, on the discretion level value, where the most appropriate notification output includes: (i) information indicative of a most appropriate ECD from the plurality of ECD, and (ii) information indicative of a most appropriate notification mode; and
   instructing, by machine logic, the most appropriate ECD to output the most appropriate notification mode,
   wherein the most appropriate notification mode may include one or more of the following: (i) vibrating one or more motors in the most appropriate ECD, (ii) vibrating one or more motors in the most appropriate ECD at varying degrees of intensity corresponding to the discretion level value of the IEC, (iii) outputting audible audio information indicative of a notification, (iv) presenting an image on one or more display(s) of the most appropriate ECD where the image is color-coded corresponding to the discretion level value for the IEC, and (v) presenting the image on the one or more display(s) of the most appropriate ECD including a level of detail of the IEC context data set where the level of detail is based upon a set of receiver-user preferences corresponding to the discretion level value.

4. The CIM of claim 1, wherein the plurality of ECD includes at least two of the following: (i) a smartphone device, (ii) a smartwatch device, (iii) a laptop computer device, (iv) a desktop computer device, (v) other types of wearable computer devices, (vi) implantable computer devices, (vii) bionic computer devices, (viii) smart speaker devices, and (ix) autonomous drone devices.

5. A computer program product (CPP) comprising:
a machine readable storage device; and
computer code stored on the machine readable storage device, with the computer code including instructions for causing a processor(s) set to perform operations including the following:
receiving a receiver-user device data set indicative of an identity of a plurality of electronic communication device(s) (ECD) belonging to the receiver-user, receiving a receiver-user contacts data set including information indicative of an identity of a plurality of contact(s),
receiving a receiver-user profile data set including a plurality context-contact management rule(s), where each rule includes information indicative of how incoming electronic communications directed to the receiver-user from one or more contact(s) should be managed on the plurality of ECD responsive to one or more conditions present in a situation context of the receiver-user, and each rule includes a priority value indicating relative priority compared to other rules,
receiving a receiver-user context data set including information indicative of a present situation context of the receiver-user,
receiving, from at least one ECD, at least one audio stream(s) corresponding to audio recording of a local environment of the at least one ECD,
determining, by machine logic, information indicative of proximity between the receiver-user and one or more individual person(s) associated with contacts of the receiver-user contacts dataset based, at least in part, on computer voice recognition identification of human speech corresponding to the one or more individual person(s) associated with contacts of the receiver-user contacts dataset in the at least one audio stream(s),
modifying, by machine logic, the receiver-user context data set to include the information indicative of proximity between the receiver-user and one or more individual person(s) associated with contacts of the receiver-user contacts dataset,
selecting, by machine logic, at least one context-contact management rule from the receiver-user profile data set for present incoming electronic communication management operations based, at least in part, on the receiver-user context data set,
receiving an incoming electronic communication (IEC) directed to the receiver-user from a contact identified in the receiver-user contacts data set;
presenting an image on one or more display(s) of the at least one ECD that includes an icon corresponding to the identity and an urgency of the IEC;
suppressing notifications for the IEC on remaining ECDs until a present context of the receiver-user context data set indicates a relaxed discretion level, and
managing, by machine logic, the IEC based, at least in part, on the selected at least one context-contact management rule(s), including:
determining, by machine logic, an IEC context data set based, at least in part, on the IEC, the receiver-user contacts data set, where the IEC context data set includes at least one of the following: (i) information indicative of content of the IEC, and (ii) information indicative of a nature of relationship between the contact identified in the receiver-user contacts data set;
wherein the information indicative of a present situation context of the receiver-user includes information indicative of a present geographic location of the receiver-user, and
the receiver-user context data set comprises wireless internet signals, RFID scanning, individual identification logging, and network connection logging.

6. The CPP of claim 5, wherein the geographic location of the receiver-user is determined based on at least one or more of: (i) Global Positioning System (GPS) coordinates, (ii) receiver-user electronic calendar entries, and (iii) social media location information provided by the receiver user.

7. The CPP of claim 5, wherein the computer code further includes instructions for causing the processor(s) set to perform the following operations:
determining a discretion level value for the IEC based, at least in part, on: (i) the plurality of ECD, (ii) the IEC context data set, and (iii) the selected at least one context-contact management rule(s);
determining a most appropriate notification output for the IEC based, at least in part, on the discretion level value, where the most appropriate notification output includes: (i) information indicative of a most appropriate ECD from the plurality of ECD, and (ii) information indicative of a most appropriate notification mode; and
instructing, by machine logic, the most appropriate ECD to output the most appropriate notification mode,
wherein the most appropriate notification mode may include one or more of the following: (i) vibrating one or more motors in the most appropriate ECD, (ii) vibrating one or more motors in the most appropriate ECD at varying degrees of intensity corresponding to the discretion level value of the IEC, (iii) outputting audible audio information indicative of a notification, (iv) presenting an image on one or more display(s) of the most appropriate ECD where the image is color-coded corresponding to the discretion level value for the IEC, and (v) presenting the image on the one or more display(s) of the most appropriate ECD including a level of detail of the IEC context data set where the level of detail is based upon a set of receiver-user preferences corresponding to the discretion level value.

8. The CPP of claim 5, wherein the plurality of ECD includes at least two of the following: (i) a smartphone device, (ii) a smartwatch device, (iii) a laptop computer device, (iv) a desktop computer device, (v) other types of wearable computer devices, (vi) implantable computer devices, (vii) bionic computer devices, (viii) smart speaker devices, and (ix) autonomous drone devices.

9. A computer system (CS) comprising:
a processor(s) set;
a machine readable storage device; and
computer code stored on the machine readable storage device, with the computer code including instructions for causing the processor(s) set to perform operations including the following:

receiving a receiver-user device data set indicative of an identity of a plurality of electronic communication device(s) (ECD) belonging to the receiver-user, receiving a receiver-user contacts data set including information indicative of an identity of a plurality of contact(s), receiving a receiver-user profile data set including a plurality context-contact management rule(s), where each rule includes information indicative of how incoming electronic communications directed to the receiver-user from one or more contact(s) should be managed on the plurality of ECD responsive to one or more conditions present in a situation context of the receiver-user, and each rule includes a priority value indicating relative priority compared to other rules, receiving a receiver-user context data set including information indicative of a present situation context of the receiver-user, receiving, from at least one ECD, at least one audio stream(s) corresponding to audio recording of a local environment of the at least one ECD, determining, by machine logic, information indicative of proximity between the receiver-user and one or more individual person(s) associated with contacts of the receiver-user contacts dataset based, at least in part, on computer voice recognition identification of human speech corresponding to the one or more individual person(s) associated with contacts of the receiver-user contacts dataset in the at least one audio stream(s), modifying, by machine logic, the receiver-user context data set to include the information indicative of proximity between the receiver-user and one or more individual person(s) associated with contacts of the receiver-user contacts dataset, selecting, by machine logic, at least one context-contact management rule from the receiver-user profile data set for present incoming electronic communication management operations based, at least in part, on the receiver-user context data set, receiving an incoming electronic communication (IEC) directed to the receiver-user from a contact identified in the receiver-user contacts data set;

presenting an image on one or more display(s) of the at least one ECD that includes an icon corresponding to the identity and an urgency of the IEC;

suppressing notifications for the IEC on remaining ECDs until a present context of the receiver-user context data set indicates a relaxed discretion level, and managing, by machine logic, the IEC based, at least in part, on the selected at least one context-contact management rule(s), including:

determining, by machine logic, an IEC context data set based, at least in part, on the IEC, the receiver-user contacts data set, where the IEC context data set includes at least one of the following: (i) information indicative of content of the IEC, and (ii) information indicative of a nature of relationship between the contact identified in the receiver-user contacts data set;

wherein the information indicative of a present situation context of the receiver-user includes information indicative of a present geographic location of the receiver-user, and the receiver-user context data set comprises a present location of the receiver-user in coordinates, a work schedule including working hours for the receiver-user, and a meeting calendar including mandatory work meetings of the receiver-user.

10. The CS of claim 9, wherein the geographic location of the receiver-user is determined based on at least one or more of: (i) Global Positioning System (GPS) coordinates, (ii) receiver-user electronic calendar entries, and (iii) social media location information provided by the receiver user.

11. The CS of claim 9, wherein the computer code further includes instructions for causing the processor(s) set to perform the following operations:

determining a discretion level value for the IEC based, at least in part, on: (i) the plurality of ECD, (ii) the IEC context data set, and (iii) the selected at least one context-contact management rule(s);

determining a most appropriate notification output for the IEC based, at least in part, on the discretion level value, where the most appropriate notification output includes: (i) information indicative of a most appropriate ECD from the plurality of ECD, and (ii) information indicative of a most appropriate notification mode;

instructing, by machine logic, the most appropriate ECD to output the most appropriate notification mode, wherein the most appropriate notification mode may include one or more of the following: (i) vibrating one or more motors in the most appropriate ECD, (ii) vibrating one or more motors in the most appropriate ECD at varying degrees of intensity corresponding to the discretion level value of the IEC, (iii) outputting audible audio information indicative of a notification, (iv) presenting an image on one or more display(s) of the most appropriate ECD where the image is color-coded corresponding to the discretion level value for the IEC, and (v) presenting the image on the one or more display(s) of the most appropriate ECD including a level of detail of the IEC context data set where the level of detail is based upon a set of receiver-user preferences corresponding to the discretion level value.

12. The CS of claim 9, wherein the plurality of ECD includes at least two of the following: (i) a smartphone device, (ii) a smartwatch device, (iii) a laptop computer device, (iv) a desktop computer device, (v) other types of wearable computer devices, (vi) implantable computer devices, (vii) bionic computer devices, (viii) smart speaker devices, and (ix) autonomous drone devices.

* * * * *